(12) United States Patent
Ukai et al.

(10) Patent No.: US 11,498,604 B2
(45) Date of Patent: Nov. 15, 2022

(54) WORK VEHICLE

(71) Applicant: Kubota Corporation, Osaka (JP)

(72) Inventors: Tomoyuki Ukai, Sakai (JP); Ryuki Wada, Sakai (JP); Naoya Otani, Sakai (JP); Takahiro Miyasaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/196,049

(22) Filed: Mar. 9, 2021

(65) Prior Publication Data

US 2021/0284225 A1 Sep. 16, 2021

(30) Foreign Application Priority Data

Mar. 10, 2020 (JP) .............................. JP2020-041207
Sep. 29, 2020 (JP) .............................. JP2020-163725

(51) Int. Cl.
*B62D 1/184* (2006.01)
*B62D 1/19* (2006.01)
*B62D 1/187* (2006.01)

(52) U.S. Cl.
CPC ............. *B62D 1/184* (2013.01); *B62D 1/187* (2013.01); *B62D 1/19* (2013.01)

(58) Field of Classification Search
CPC ................................................. B62D 1/184
See application file for complete search history.

(56) References Cited

U.S. PATENT DOCUMENTS

| 4,732,050 A * | 3/1988 | Vollmer | F16B 5/0225 |
| | | | 280/775 |
| 9,796,406 B2 * | 10/2017 | Takagi | B60R 16/0215 |
| 10,946,887 B2 * | 3/2021 | Yoshioka | B62D 1/184 |
| 2004/0104566 A1 * | 6/2004 | Adoline | B62D 1/184 |
| | | | 280/775 |
| 2006/0131865 A1 * | 6/2006 | Wasek | B62D 1/184 |
| | | | 280/775 |
| 2007/0262221 A1 * | 11/2007 | Schroder | F16F 9/56 |
| | | | 248/278.1 |
| 2011/0314953 A1 * | 12/2011 | Nakamura | B62D 1/184 |
| | | | 74/493 |
| 2016/0236703 A1 * | 8/2016 | Kuwabara | B62D 1/187 |

FOREIGN PATENT DOCUMENTS

| BR | 102014010788 A2 * | 12/2017 | ............ B62D 1/184 |
| CN | 111770871 A * | 10/2020 | ............ B62D 1/184 |
| CN | 111791940 A * | 10/2020 | ............ B62D 1/184 |

(Continued)

*Primary Examiner* — Nicole T Verley
(74) *Attorney, Agent, or Firm* — The Webb Law Firm

(57) ABSTRACT

An annular member includes a first through hole extending through a first face to a second face forming the back face relative to the first face and having an inner face formed as a concave curved face and a tubular spherical inner ring having an outer face formed as a convex curved face extending along the inner face of the first through hole. The spherical inner face is pivotable and tiltable along the inner face of the first through hole. In a lock mechanism, the annular member is supported to a steering support mount with a support portion being fixed to the spherical inner ring of the annular member provided at the one end and the other end is pivotally supported to a vehicle body frame and supports a tilt lever.

4 Claims, 12 Drawing Sheets

(56) References Cited

FOREIGN PATENT DOCUMENTS

| | | | |
|---|---|---|---|
| DE | 4138583 C1 * | 4/1993 | ............. B62D 1/184 |
| DE | 102008011620 A1 * | 10/2009 | ............. B62D 1/184 |
| DE | 102009001324 A1 * | 9/2010 | ............. B62D 1/181 |
| DE | 102018128119 A1 * | 5/2020 | ............. B62D 1/184 |
| EP | 1500570 A2 * | 1/2005 | ............. B62D 1/184 |
| EP | 2423073 A1 * | 2/2012 | ............. B62D 1/184 |
| GB | 2092966 A * | 8/1982 | ............. B62D 1/184 |
| GB | 2521518 A * | 6/2015 | ............. B62D 1/184 |
| JP | 201211800 A | 1/2012 | |
| JP | 2012011800 A * | 1/2012 | ............. B62D 1/184 |
| JP | 5486517 B2 * | 5/2014 | ............. B62D 1/183 |
| JP | 2019116180 A * | 7/2019 | |
| JP | 2020032968 A * | 3/2020 | ............. B62D 1/184 |
| SE | 1451075 A1 * | 3/2016 | |
| WO | WO-0181149 A2 * | 11/2001 | ............. B62D 1/181 |
| WO | WO-2004089722 A1 * | 10/2004 | ............. B62D 1/184 |
| WO | WO-2007014408 A1 * | 2/2007 | ............. B62D 1/184 |
| WO | WO-2007058158 A1 * | 5/2007 | ............. B62D 1/184 |
| WO | WO-2012035967 A1 * | 3/2012 | ............. B62D 1/184 |
| WO | WO-2014007304 A1 * | 1/2014 | ............. B62D 1/184 |
| WO | WO-2014069140 A1 * | 5/2014 | ............. B62D 1/184 |
| WO | WO-2015016311 A1 * | 2/2015 | ............. B62D 1/184 |
| WO | WO-2015119000 A1 * | 8/2015 | ............. B62D 1/184 |
| WO | WO-2015195226 A1 * | 12/2015 | ............. B62D 1/184 |

* cited by examiner

WORK VEHICLE

CROSS-REFERENCE TO RELATED APPLICATIONS

This application claims priority to Japanese Patent Application Nos. 2020-041207 filed Mar. 10, 2020, and 2020-163725 filed Sep. 29, 2020, the disclosures of which are hereby incorporated by reference in their entirety.

BACKGROUND OF THE INVENTION

Technical Field

The present invention relates to a work vehicle allowing its steering operation in the course of traveling.

Description of Related Art

As shown in Patent Document 1, with a work vehicle such as a UV (utility vehicle), in the course of its traveling, its steering operation by means of a handle (steering wheel) is carried out. For adjustment to a position that adds comfort to its operability, there is known a handle equipped with a tilt mechanism. Such handle is position-adjustable about a shaft (tilt shaft) which extends to intersect a rotational shaft of the handle. As the distance and/or the height thereof relative to a driver are/is adjusted, an adjustment is made to a position that gives comfort to the driver during an operation of the handle.

The tilt mechanism includes an operational layer (tilt lever) and a gas cylinder (damper) having a lock function. The operational lever is operated between a tilt-enabling position where the position adjustment of the handle is enabled and a tilt-disabling position where the position adjustment of the handle is disabled or inhibited. The gas cylinder has its one end fixed to a frame of the vehicle body (vehicle body frame) and has its other end pivotally supported via a ball joint or the like to a handle support mount (steering mount) which supports the handle. As the gas cylinder is supported via the ball joint, assembly of the gas cylinder is facilitated. When the operational lever is operated to the tilt-disabling position, the lock function is activated to inhibit position adjustment of the handle, whereas when the operational lever is operated to the tilt-enabling position, the lock function is released to allow the handle position adjustment.

Patent Document 1: Japanese Unexamined Patent Application Publication No. 2012-11800

SUMMARY OF THE INVENTION

However, since the other end of the gas cylinder (damper) is pivotally supported to the handle support mount (steering mount), looseness may be developed at its support portion. Further, the one end of the gas cylinder (damper) is provided with a gap relative to the vehicle body frame for the purpose of suppressing increase of the pivotal resistance encountered at the time of tilting, and this gap may sometimes lead to development of looseness at the support portion. And, such looseness(es) developed at the support portion are amplified at the handle portion. And, the degree of this amplification is determined by the link corresponding to the ratio of the distance between the handle (steering wheel) and the tilt shaft relative to the distance between the support portion and the tilt shaft. For this reason, there is a need for improvement of the operability of the steering wheel by suppressing looseness developed in the steering wheel while allowing pivotal support between the damper and the steering support mount or the vehicle body frame with less pivotal resistance.

In view of the above, the primary object of the present invention is to ensure favorable operability.

For accomplishing the above-noted object, a work vehicle according to one embodiment of the present invention comprises:

a vehicle body frame;

a shaft supported to the vehicle body frame;

a steering support mount supported to the vehicle body frame to be pivotable along the shaft;

a steering shaft pivotally supported to the steering support mount;

a steering wheel fixed to the steering shaft;

a support portion provided in the steering support mount;

a lock mechanism having an annular member at one end thereof and configured to be changeable in its state between a releasing state for allowing a pivotal movement of the steering support mount and a locking state for inhibiting the pivotal movement; and a tilt lever for causing a state change of the lock mechanism to either the releasing state or the locking state;

wherein the annular member includes:

a first through hole extending through a first face to a second face forming the back face relative to the first face and having an inner face formed as a concave curved face, and a tubular spherical inner ring having an outer face formed as a convex curved face extending along the inner face of the first through hole;

wherein the spherical inner face is pivotable and tiltable along the inner face of the first through hole; and wherein in the lock mechanism, the annular member is supported to the steering support mount with the support portion being fixed to the spherical inner ring of the annular member provided at the one end and the other end is pivotally supported to the vehicle body frame and supports the tilt lever.

The lock mechanism is supported to the vehicle body frame and in association with a tilting motion of the steering wheel and effects a pivotal movement relative to the steering support mount via the annular member provided at the one end of the lock mechanism and effects a pivotal movement relative to the vehicle body frame at the other end of the lock mechanism. Further, since this lock mechanism has its opposed ends to be pivotally supported to the steering support mount and the vehicle body frame respectively, the attaching operation of the lock mechanism needs to be easy.

As the lock mechanism is pivotally supported to the steering support mount via the annular member, a pivotal movement of the lock mechanism about an axis relative to the steering support mount is made possible and tilting thereof relative to the axis is made possible also. And, as the lock mechanism is configured to be tiltable relative to the steering support mount, attachment of the lock mechanism is made easy.

Moreover, respecting the annular member, the inner face of the through hole is placed in close or gapless contact with the outer face of the spherical inner ring and also this spherical inner ring is fixed to the support portion. Thus, development of looseness in this annular member is suppressed. As a result, development of looseness in the steering wheel is suppressed to provide favorable operability of the steering wheel.

Preferably, the inner face of the spherical inner ring has a smooth second through hole;

the support portion and the spherical inner ring are threaded to each other via a bolt; and the bolt is inserted to the second through hole of the spherical inner ring, the bolt and the inner face of the second through hole together forming a smooth contact portion, thus forming gapless contact between the bolt and the inner face of the second through hole.

With the above-described arrangement, the pivotal movement and the tilting movement of the lock mechanism are made possible and development of looseness in the annular member is suppressed. Moreover, the arrangement makes it easier to support the annular member to the steering support mount.

A work vehicle according to a further embodiment of the present invention comprises:

a vehicle body frame;

a shaft supported to the vehicle body frame;

a steering support mount supported to the vehicle body frame to be pivotable along the shaft;

a steering shaft pivotally supported to the steering support mount;

a steering wheel fixed to the steering shaft;

a lock mechanism configured to be changeable in its state between a releasing state for allowing a pivotal movement of the steering support mount and a locking state for inhibiting the pivotal movement, the lock mechanism being supported to the vehicle body frame to be pivotable along a pivot axis;

an elastic body provided on the pivot axis between the vehicle body frame and the lock mechanism; and a tilt lever for causing a state change of the lock mechanism to either the releasing state or the locking state.

With the above-described arrangement, it is possible to suppress resistance encountered by the lock mechanism when pivoting relative to the vehicle body frame and also to cause the elastic body to fill a gap between the lock mechanism and the vehicle body frame. Consequently, shaking or pitching of the lock mechanism can be suppressed, whereby looseness of the steering wheel can be suppressed.

Preferably, the lock mechanism has its one end supported to the vehicle body frame and its other end supported to the steering support mount.

With the above-described arrangement, in the tilting movement, the steering wheel is position-adjusted together with the lock mechanism and the steering support mount. In the course of this, resistance encountered by the lock mechanism when pivoting relative to the vehicle body frame is suppressed and at the same time shaking of the lock mechanism is suppressed also, so looseness of the steering wheel can be suppressed effectively.

Preferably, the elastic body comprises one or more disc springs.

With the above-described arrangement, an elastic (or resilient) force is generated in association with collapsing of the disc spring(s). Thus, with such simple arrangement, it is possible to suppress shaking of the lock mechanism while suppressing the resistance encountered by the lock mechanism during its pivoting relative to the vehicle body frame, thus effectively suppressing looseness of the steering wheel.

Optionally, the lock mechanism comprises a damper.

With use of a damper, the lock mechanism can be constituted of a simple arrangement.

DETAILED DESCRIPTION OF THE INVENTION

Next, a work vehicle relating to the present invention will be explained with reference to the accompanying drawings by way of an example thereof configured as a multiple-purpose work vehicle (UV).

Figure 1:
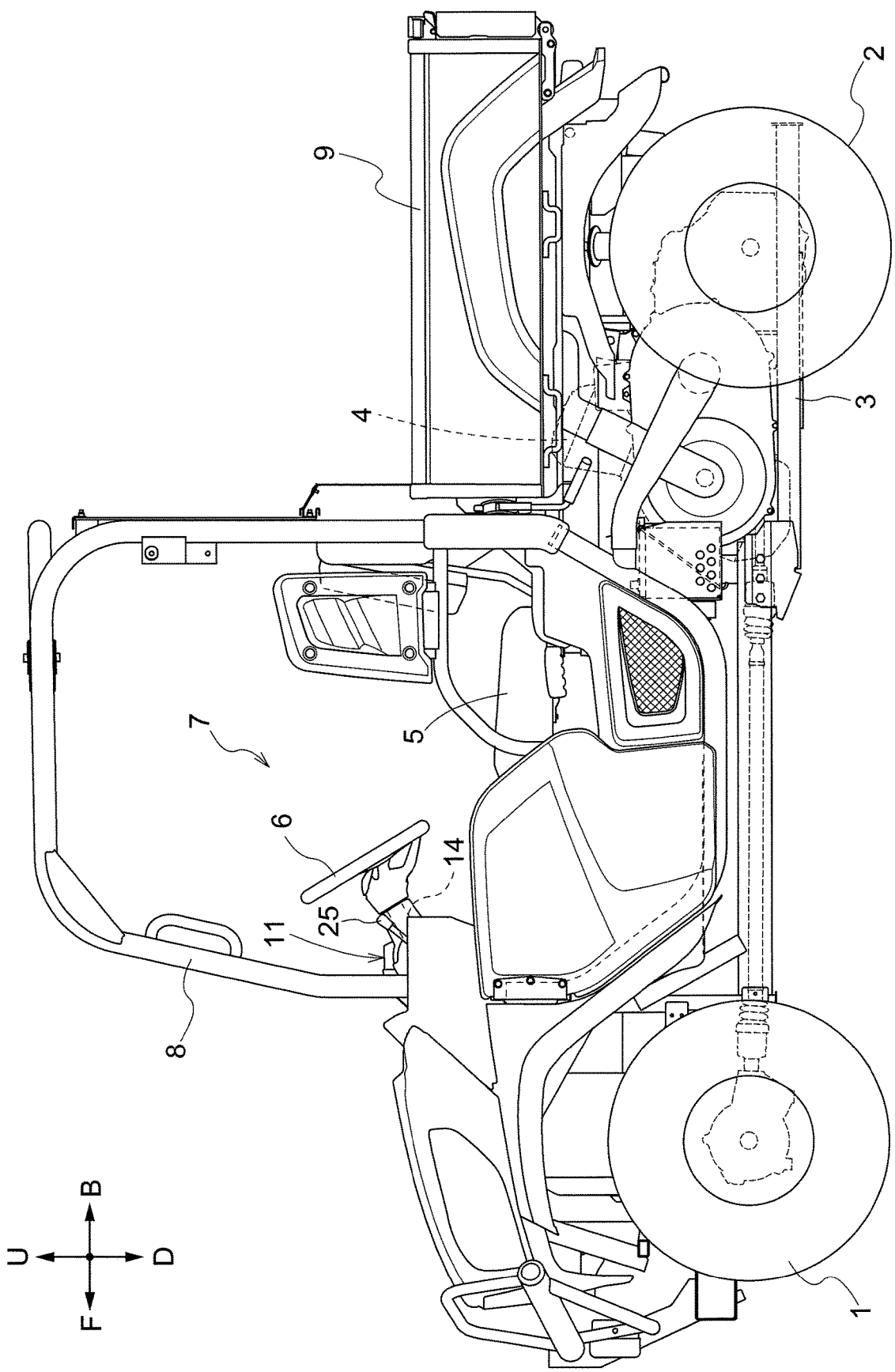
FIG. 1 is a left side view of a multiple-purpose work vehicle.

Incidentally, in the following explanation, relative to a vehicle body frame of the multiple-purpose work vehicle, the direction of arrow F shown in FIG. 1 is defined as "vehicle body front side", the direction of arrow B shown therein is defined as "vehicle body rear (back) side", the direction of arrow U shown therein is defined as "vehicle body upper side", the direction of allow D shown therein is defined as "vehicle body lower (down) side", the direction on the font side of the illustration plane is defined as "vehicle body left side" and the direction of the back side of the illustration plane is defined as "vehicle body right side", respectively.

[General Configuration of Multiple-Purpose Work Vehicle]

As shown in FIG. 1, the multiple-purpose work vehicle includes, as a traveling device, a pair of left and right steerable and drivable front wheels 1 and a pair of left and right drivable rear wheels 2. The multiple-purpose work vehicle includes also a driving section 7 between the front wheels 1 and the rear wheels 2. The driving section 7 includes a driver's seat 5 and a steering wheel 6 for steering the front wheels 1. In the driving section 7, there is provided a ROPS (roll-over protection system) 8 which covers the driver riding space. The multiple-purpose work vehicle includes a load-carrying deck 9 at a rear portion of a vehicle body frame 3. The multiple-purpose work vehicle further includes an engine 4 disposed under the load-carrying deck 9, so that the vehicle travels as power of the engine 4 is transmitted to the front wheels 1 and the rear wheels 2.

[Driving Panel]

Figure 2:
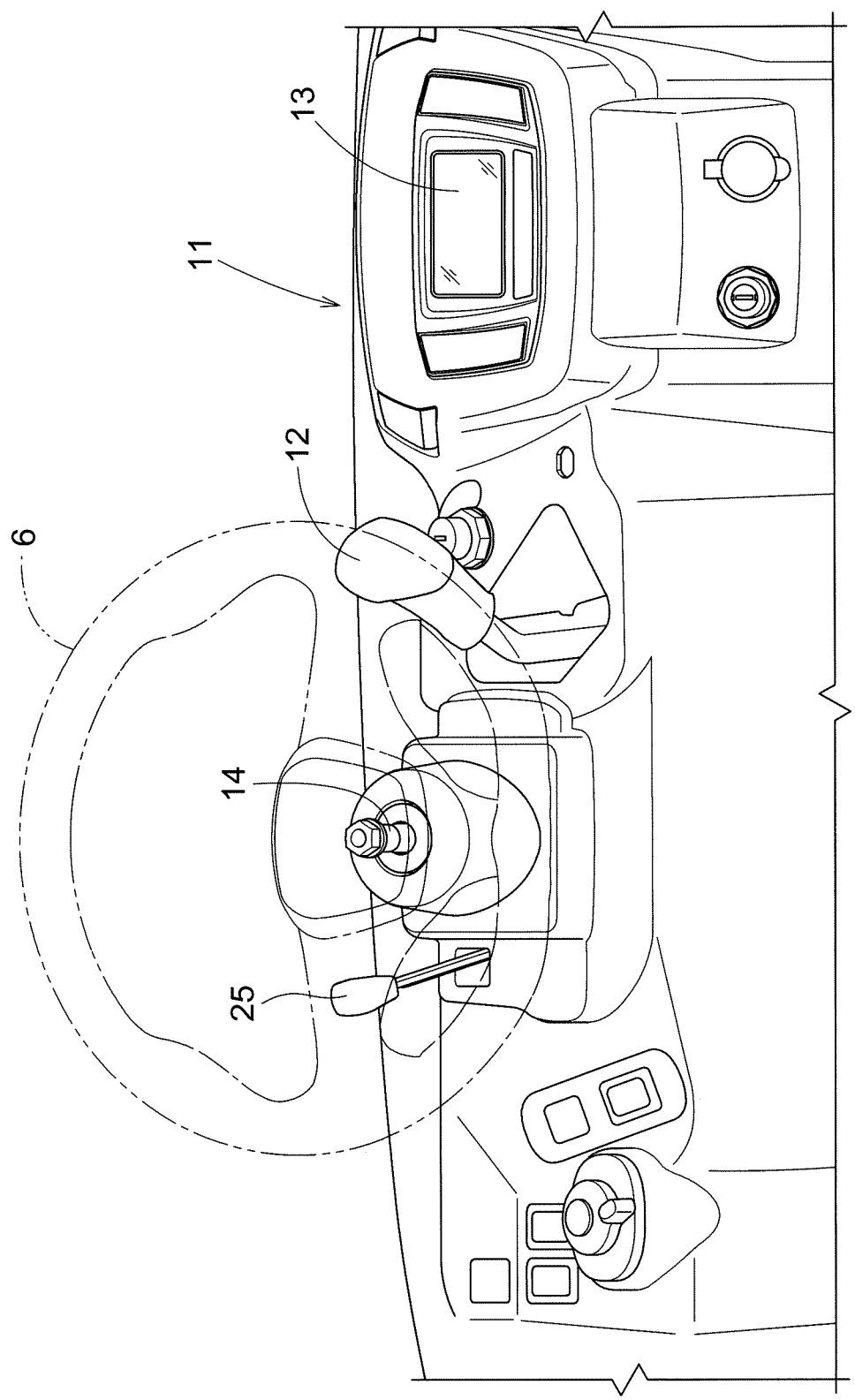
FIG. 2 is a rear view illustrating an arrangement of a driving panel.

As shown in FIG. 1 and FIG. 2, a driving panel 11 is provided forwardly of the driver's seat 5 of the driving section 7. In this driving panel 11, there are provided the steering wheel 6, a tilt lever 25 for tilting the steering wheel 6, a shift lever 12 for operating for forward traveling and reverse traveling, a monitor 13 for displaying various kinds of information, etc.

[Steering Wheel]

[Steering Wheel]

The steering wheel 6 is fixed to an end portion of a steering shaft 14 which protrudes from the driving panel 11. When the steering wheel 6 is rotatably operated, in association with this rotation of the steering wheel 6, the steering shaft 14 is rotated. And, in correspondence with this rotational movement of the steering shaft 14, the direction (orientation) of the front wheels 1 is changed via a shaft 15 (see FIG. 4), etc. In this way, by an operation of the steering wheel 6, the direction (orientation) of the front wheels 1 is changed to allow a steering operation.

The steering wheel 6 is configured to allow a tilting operation for adjustment of its height position relative to the driving panel 11. Specifically, the steering shaft 14 is supported to be pivotable about an axis located within the driving panel 10 and extending along the left/right direction of the vehicle body and its pivotal position can be fixed or locked by means of a tilt mechanism 19 (see FIG. 3). For causing the steering wheel 6 to effect a tilting movement, the driver will operate the tilt lever 25 to release fixing of the steering shaft 14 by the tilt mechanism 20 (see FIG. 3) (releasing state) and under this state, the steering shaft 14 to which the steering wheel 6 is fixed is pivoted to fix the steering wheel 6 in position. Then, the driver will operate the tilt lever 25 to cause the tilt mechanism 20 (see FIG. 3) to lock the steering wheel 14 (locking state). In this way, the operability can be improved by the driver's adjustment of the steering wheel 6 to a desired position.

[Tilt Mechanism]

Next, the arrangement of the tilt mechanism 20 will be explained with reference to FIGS. 3 through 6.

The tilt mechanism 20 is supported to the vehicle body frame 3 and pivotally supports the steering shaft 14 to which the steering wheel 6 is fixed. The tilt mechanism 20 includes a stay 21 supported to the vehicle body frame 3, a steering support mount 22, a damper 30, and an arm 24.

The stay 21 includes, at a portion thereof provided in the vehicle body left/right direction of the vehicle body frame 3, two left stay 21a and right stay 21b fixed in juxtaposition in the vehicle body left/right direction. Further, the stay 21 includes a shaft 21c provided between the left stay 21a and the right stay 21b. This shaft 21c is rotatable along the axial direction.

The steering support mount 22 is fixed to the shaft 21c and supported to the stay 21 to be pivotable about the axis together with the shaft 21c. The steering support mount 22 supports the steering shaft 14 to which the steering wheel 6 is fixed. Thus, the steering wheel 6 and the steering shaft 14 are pivotable about the axis of the shaft 21c of the steering support mount 22.

As described above, the tilt mechanism 20 includes the damper 30. This damper 30 constitutes a "lock mechanism" which can be changed in its state between a locking state for inhibiting pivotal movement of the steering support mount 22 by fixing this steering support mount 22 to the stay 21 and a releasing state for allowing pivotal movement of the steering support mount 22 relative to the stay 21. The tilt lever 25 is operated to cause the damper 20 to be changed in its state between the locking state and the releasing state.

The damper 30 has one end thereof pivotally supported to the left stay 21a and the other end thereof pivotally supported to the steering support mount 22.

At the one end of the damper 30, there is provided an arm support portion 26 and this arm support portion 26 is pivotally supported to the left stay 21a. The arm support portion 26 includes a through hole 26a and an arm support hole 26b. The left stay 21a includes a shaft 21d, and as the shaft 21d extends through the through hole 26b, the damper 30 is pivotally supported to the left stay 21a. The shaft 21 is retained by a pin 21g or the like, so that the shaft 21d will not be withdrawn from the through hole 26a inadvertently.

An arm 24 is provided in the form of an L-shaped rod, consisting of a long side portion 24a and a short side portion 24b. The short side portion 24b of the arm 24 is inserted to the arm support hole 26b. As the aperture diameter of the arm support hole 26b is larger than the thickness of the short side portion 24b of the arm 24, so that the short side portion 24b of the arm 24 is vertically pivotable within the arm support hole 26. To the long side portion 24a of the arm 24, the tilt lever 25 is attached. The tilt lever 25 is supported to be pivotable about the shaft 21c and its rear end portion is connected to the long side portion 24a of the arm 24. As will be described later, when the tilt lever 25 is vertically pivoted, the arm 24 will be vertically pivoted about the bent portion of the arm 24, whereby the arm 24 can cause to the damper 30 to be changed in its state between the locking state and the releasing state, as will be described later.

Figure 5:
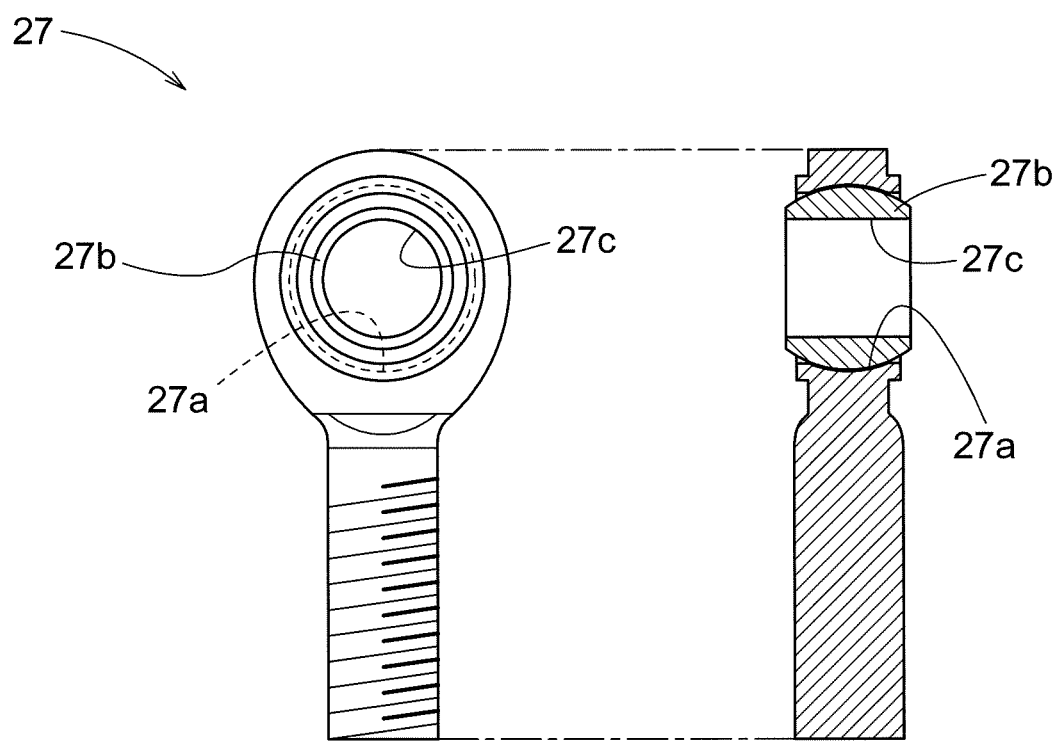
FIG. 5 is a view illustrating an arrangement of a pillow ball joint.

At the rear end of the damper 30, there is attached a pillow ball joint 27 (corresponding to an "annular member"). As shown in FIG. 5, the pillow ball joint 27 includes a through hole 27a (corresponding to a "first through hole") extending through a first face and a second face forming the back face relative to the first face and having an inner face formed as a concave curved face, and a tubular spherical inner ring 27b having an outer face which is formed as a convex curved face extending along the inner face of the through hole 27a. The spherical inner ring 27b includes a tubular through hole 27c (corresponding to a "second through hole") having a round cross section. The spherical inner ring 27b can be pivoted along the inner face of the through hole 27a about the penetration direction and can be also tilted relative to the penetration direction.

Figure 3:
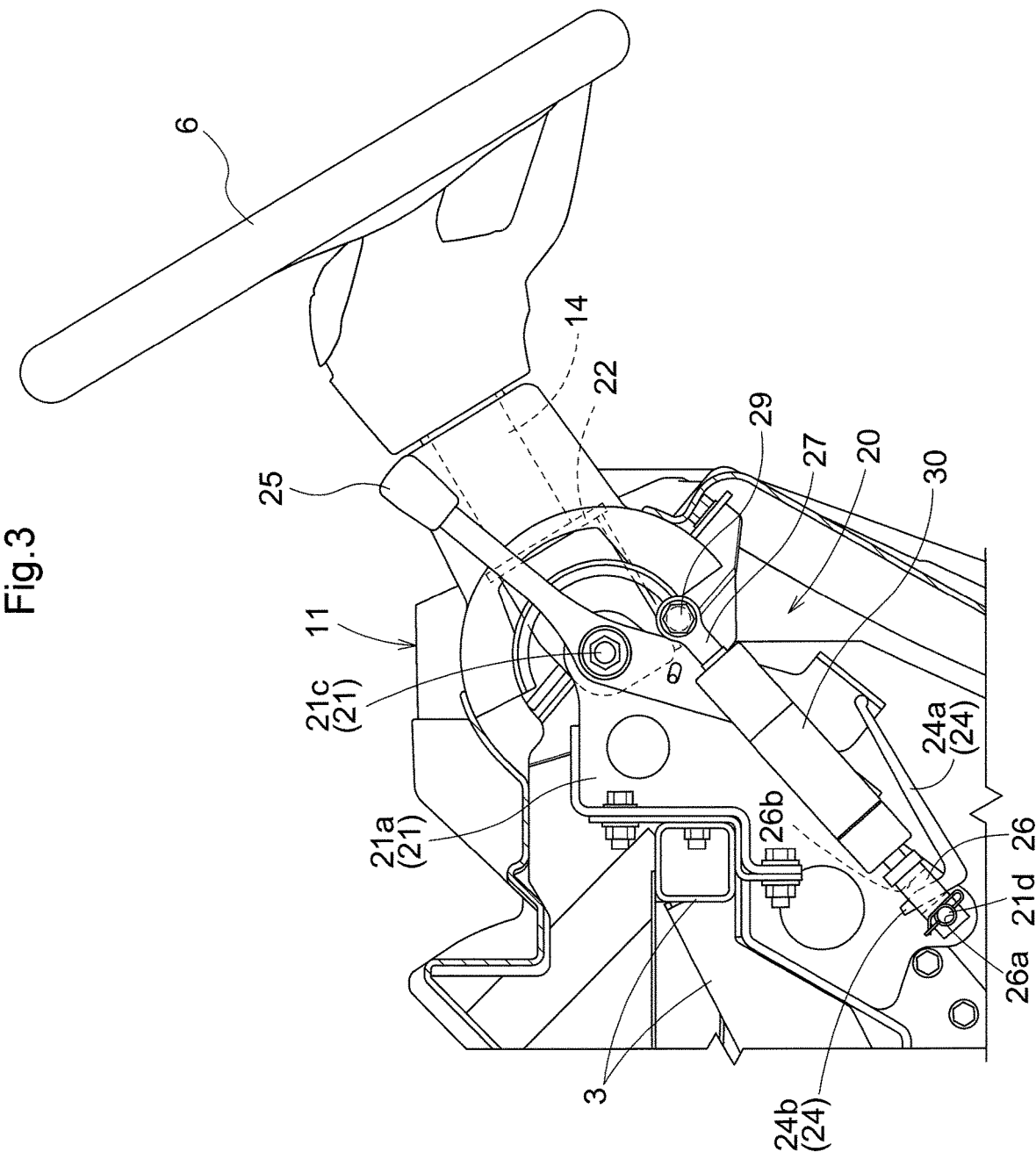
FIG. 3 is a left side view in section illustrating a principal portion arrangement of a tilt mechanism.
Figure 4:
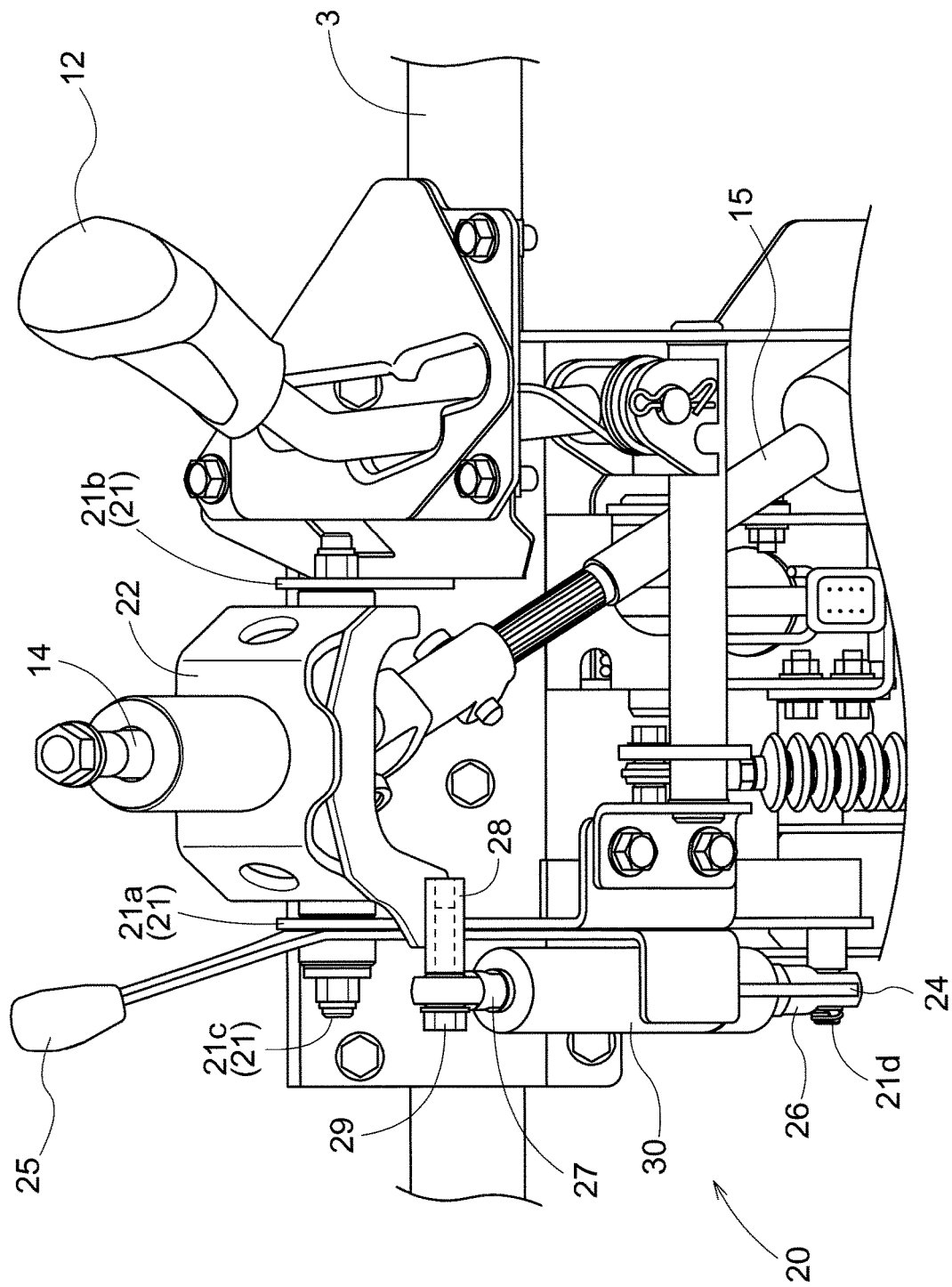
FIG. 4 is a rear view in section showing the principal portion arrangement of the tilt mechanism.

As shown in FIG. 3 and FIG. 4, the steering support mount 22 includes a nut-like support portion 28. The pillow ball joint 27 and the support portion 28 are fixed to each other via a bolt 29. In the inner face of the support portion 28, a female thread is provided. The bolt 29 has a male thread at its leading end portion and has a smooth portion at its base end portion. The smooth portion has a cylindrical shape and its diameter is approximately equal to or slightly smaller than that of the through hole 27c of the spherical inner ring 27. The bolt 29 is inserted into the thorough hole 27c of the pillow ball joint 27 and also the support portion 28, and the bolt 29 is threaded to the support portion 28. In this threading, the through hole 27c and the smooth portion of the bolt 29 come into close or gapless contact with each other. As the spherical inner ring 27b of the pillow ball joint 27 can be pivoted about the penetration direction along the inner face of the through hole 27a and can be also tilted relative to this penetration direction, the damper 30 can be tilted and pivoted relative to the axial direction of the bolt 29.

With the above-described arrangement, the damper 30, under its attached state, can be pivoted relative to the steering support mount 22; and also when the damper 30 is to be attached, this attachment can be carried out easily with tilting of the damper 30. Moreover, since the through hole 27a of the pillow ball joint 27 and the spherical inner ring 27b slide relative to each other while being kept in close contact with each other, there is virtually no gap present between the through hole 27a and the spherical inner ring 27b. Moreover, since the through hole 27c and the smooth portion of the bolt 29 are also in close contact with each other, there is virtually no gap present between the through hole 27c and the smooth portion of the bolt 29, either. As a result, looseness between the damper 30 and the steering support mount 22 is minimized and looseness which may be developed in the steering wheel 6 will not increase, either, whereby the operability of the steering wheel 6 is improved.

The tilt mechanism 20 is rendered into the releasing state when the damper 30 is under an expandable/contractable state and rendered into the locking state when the expansion/contraction of the damper 30 is restricted.

Figure 6:
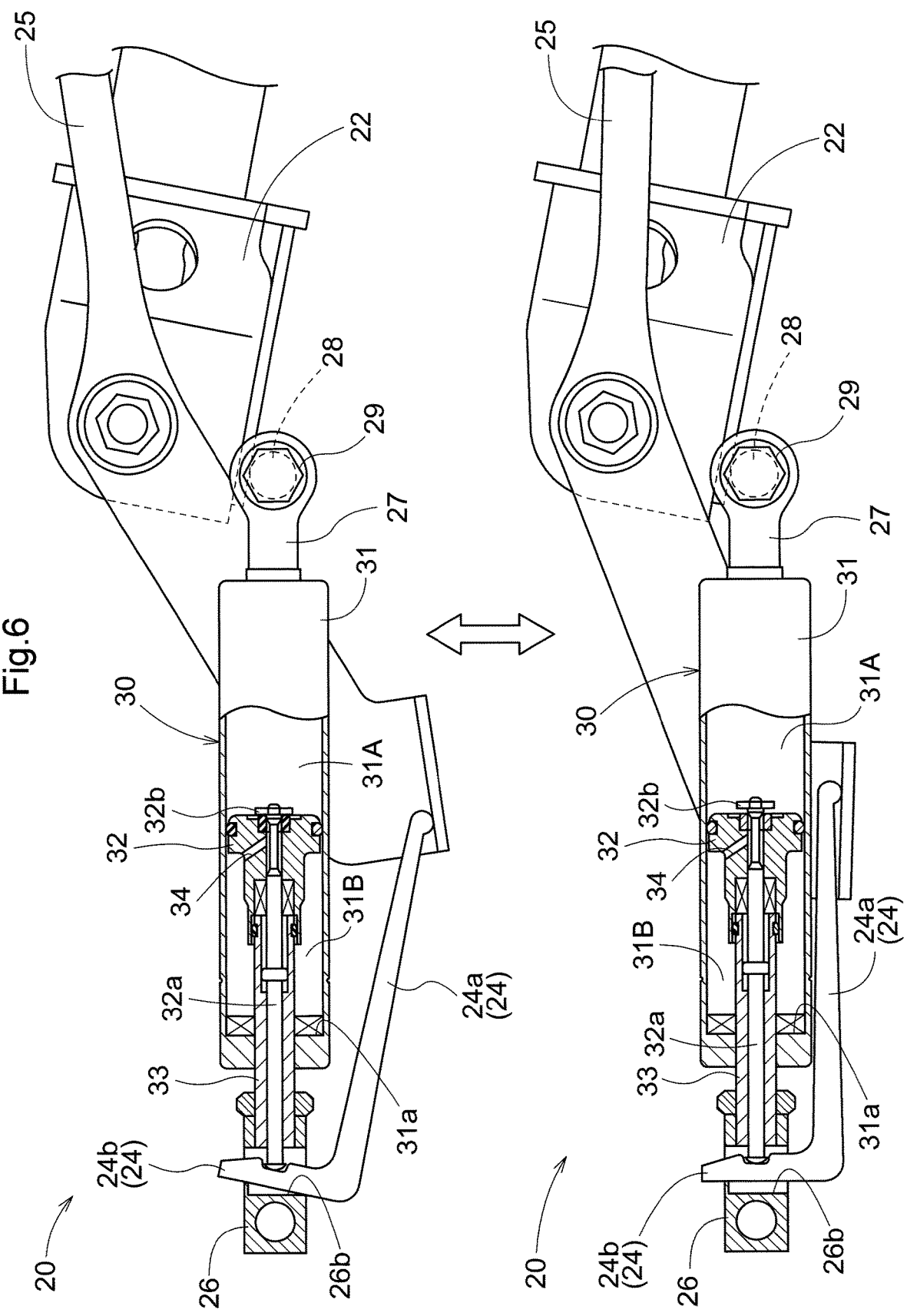
FIG. 6 is a partial section illustrating an arrangement of a damper.

As shown in FIG. 6, the damper 30 includes a tubular cylinder 31 having opposed ends thereof closed, a piston 32 fitted within the cylinder 31 and a piston rod 33 having one end thereof connected to the piston 32 and penetrating a bottom portion 31a of the cylinder 31. The inside of the cylinder 31 is divided into a first chamber 31A and a second chamber 31B whose volumes are changed in association with a sliding movement of the piston 32 within the cylinder 31. Into the piston rod 33, an operational rod 32a is inserted; and one end of the operational rod 32a reaches the first chamber 31A and at the leading end of the one end, a valve body 32b is provided.

The piston 32 has an orifice 34 which establishes communication between the first chamber 31A and the second chamber 31B. With this orifice 34 in operation, when the operational rod 32a is operated in the direction to be withdrawn from the damper 30, its end portion on the side of the first chamber 31A is closed by the valve body 32b, thus blocking communication between the first chamber 31A and the second chamber 31B. Whereas, when the operational rod 32a is pushed to the inside of the damper 30, the valve body 32b moves away from the piston 32 to establish communication between the first chamber 31A and the second chamber 31B. Under this condition of the first chamber 31A and the second chamber 31B being communicated with each other with moving of the valve body 32b away from the piston 32, the piston 32 is allowed to slide within the cylinder 31 and the damper 30 can expand/contract (the state illustrated in the right-side view in FIG. 6). On the other hand, under the condition of the communication between the first chamber 31A and the second chamber 31B being blocked, the inside pressure of the first chamber 31A is in equilibrium with the inside pressure of the second chamber 31B, whereby the piston 32 is not allowed to slide within the cylinder 31 and the expansion/contract of the damper 30 is restricted (the state illustrated in the left-side view in FIG. 6).

As shown in FIG. 3 and FIG. 6, the other end relative to the one end of the operational rod 32a where the valve body 32b is provided extends to reach the arm support hole 26b of the arm support portion 26, thus being supported to the arm 24 inserted in this arm support hole 26b. The arm 24 is pivoted in accordance with an operated position of the tilt lever 25. In this, the arm 24 will be pivoted about a portion within the arm support hole 26b where the leading end of the arm 24 and the arm support portion 26 are in contact with each other. And, as the arm 24 is placed in contact with the operational rod 32a, the operational rod 32a will be inserted or withdrawn relative to the piston rod 33 and the piston 32, in correspondence with the pivotal movement of the arm 24, thereby the valve body 32b opens/closes the orifice 34. As a result, by operating the tilt lever 25, the opening/closing of the orifice 34 by the valve body 32b is controlled and expansion/contraction of the damper 30 is allowed/inhibited, and the tilt mechanism 20 is changed in its state between the releasing state and the locking state.

As described above, by operating the tilt lever 25, the tilt mechanism 20 can be rendered into the releasing state to allow position adjustment of the steering wheel 6 and also by operating the tilt lever 25, the tilt mechanism 20 can be rendered into the locking state to fix the steering wheel 6 in position. At the time of such tilting movements, the damper 30 is pivoted about the axis of the shaft 21d. Further, the damper 30 is pivoted relative to the steering support mount 22 about the axis of the bolt 29 of the support portion 28. And, as the damper 30 and the steering support mount 22 are pivoted about the axis of the shaft 21d, position adjustment of the steering wheel 6 is effected.

Other Embodiments (1) The arrangements of supporting the damper 30 and the tilt lever 25 are not limited to the above-described arrangements, but may be other arrangements that allow the restriction of expansion/contraction of the damper 30 by the tilt lever 25.

Figure 7:
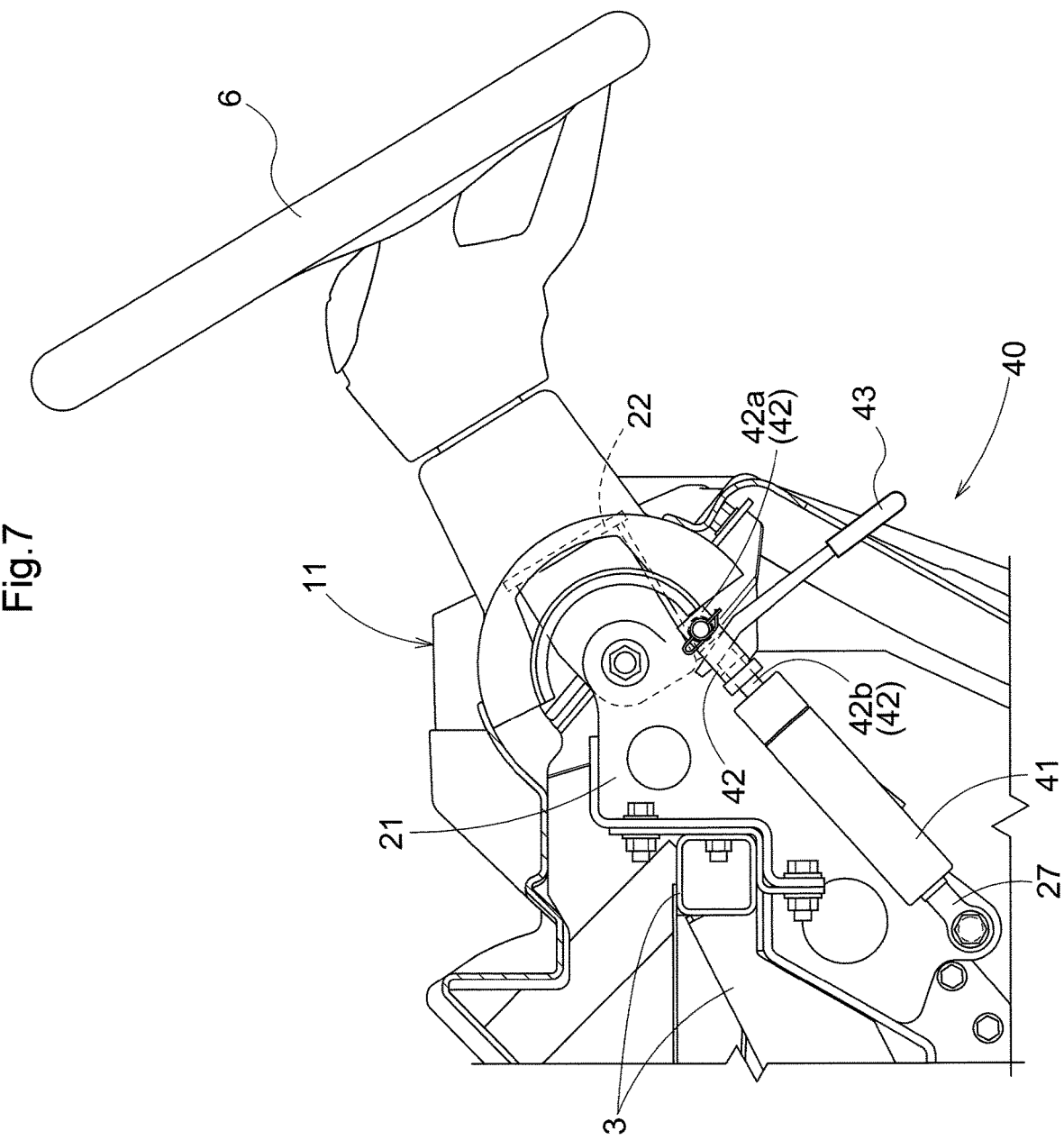
FIG. 7 is a left side cross sectional view illustrating a principal portion arrangement of a tilt mechanism relating to a further embodiment.
Figure 8:
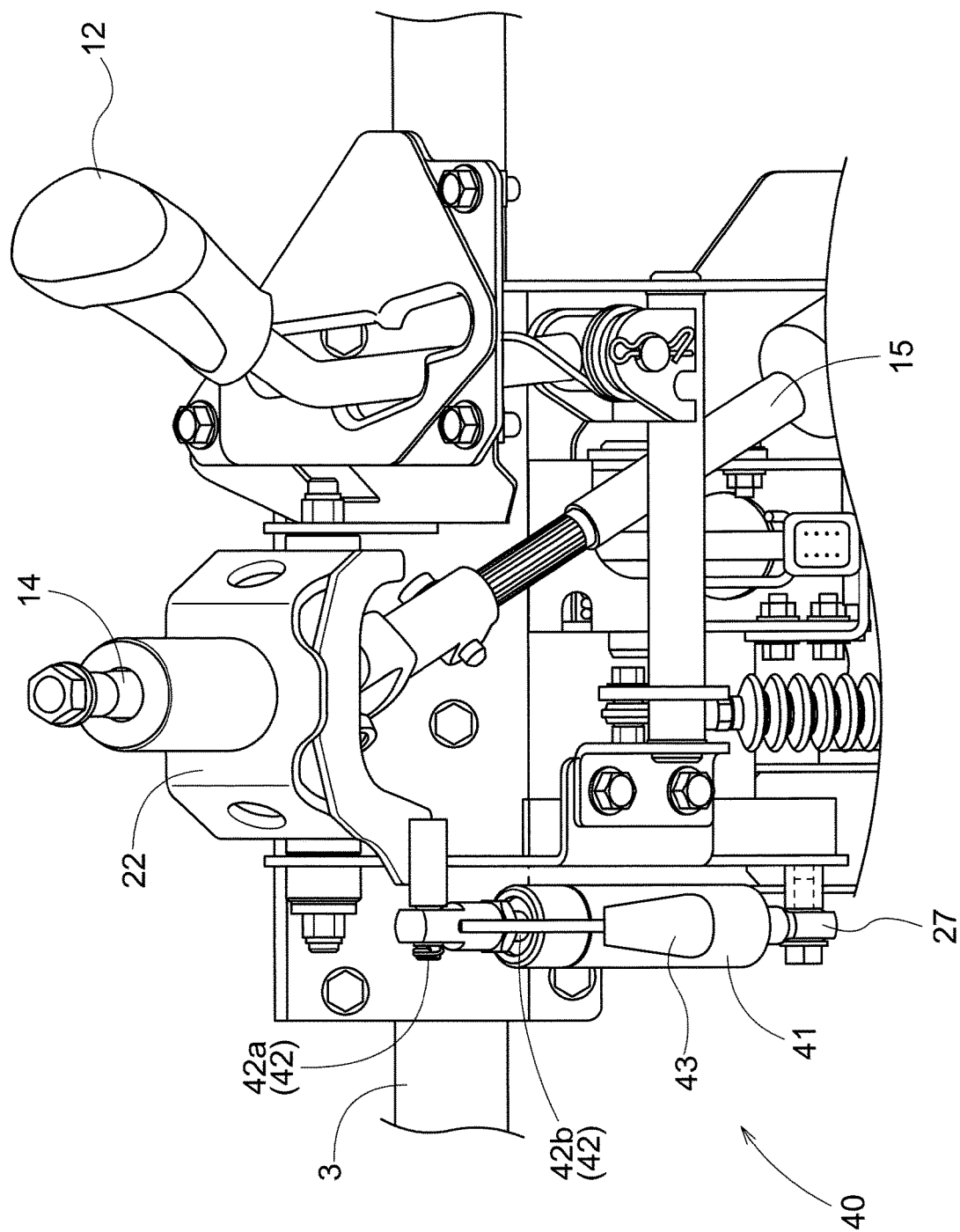
FIG. 8 is a rear side cross sectional view showing the principal portion arrangement of the tilt mechanism relating to the further embodiment.

For instance, as shown in FIG. 6, FIG. 7 and FIG. 8, in a tilt mechanism 40 relating to this embodiment, a damper 41, like the foregoing embodiment, includes a cylinder 31, a piston 32, a piston rod 33, an operational rod 32a, a valve body 32b and a pillow ball joint 27. Further, this damper 41 includes an am support portion 42. The pillow ball joint 27 is supported to the stay 21 and the arm support portion 42 is supported to the steering support mount 22.

The arm support portion 42 includes a holding portion 42a in the form of a bottomed cylinder and a slidable portion 44b to which a tilt lever 43 is connected. The holding portion 42a is fixed to the steering support mount 22. The slidable portion 42b is connected to the operational rod 32a and inserted into the holding portion 42a to be slidable along the inner face of this holding portion 42a. With this arrangement, as the tilt lever 43 is operated, the slidable portion 42b slides to cause insertion/withdrawal of the operational rod 32a. As a result, the tilt lever 43 can control opening/closing of the valve body 32b and can change the tilt mechanism 40 in its state between the releasing state and the locking state.

(2) In the foregoing respective embodiments, the arrangement of supporting the arm support portion 26 of the damper 30 shown in FIG. 3 and FIG. 4 to the stay 21 and the arrangement of supporting the arm support portion 42 of the damper 41 shown in FIG. 7 and FIG. 8 to the steering support mount 22 may be other arrangements.

Firstly, the detailed arrangements in the above respective embodiments will be explained with reference to FIG. 9, by taking an example an arrangement of supporting the arm support portion 26 of the damper 30 shown in FIGS. 3 and 4 to the left stay 21a.

Figure 9:
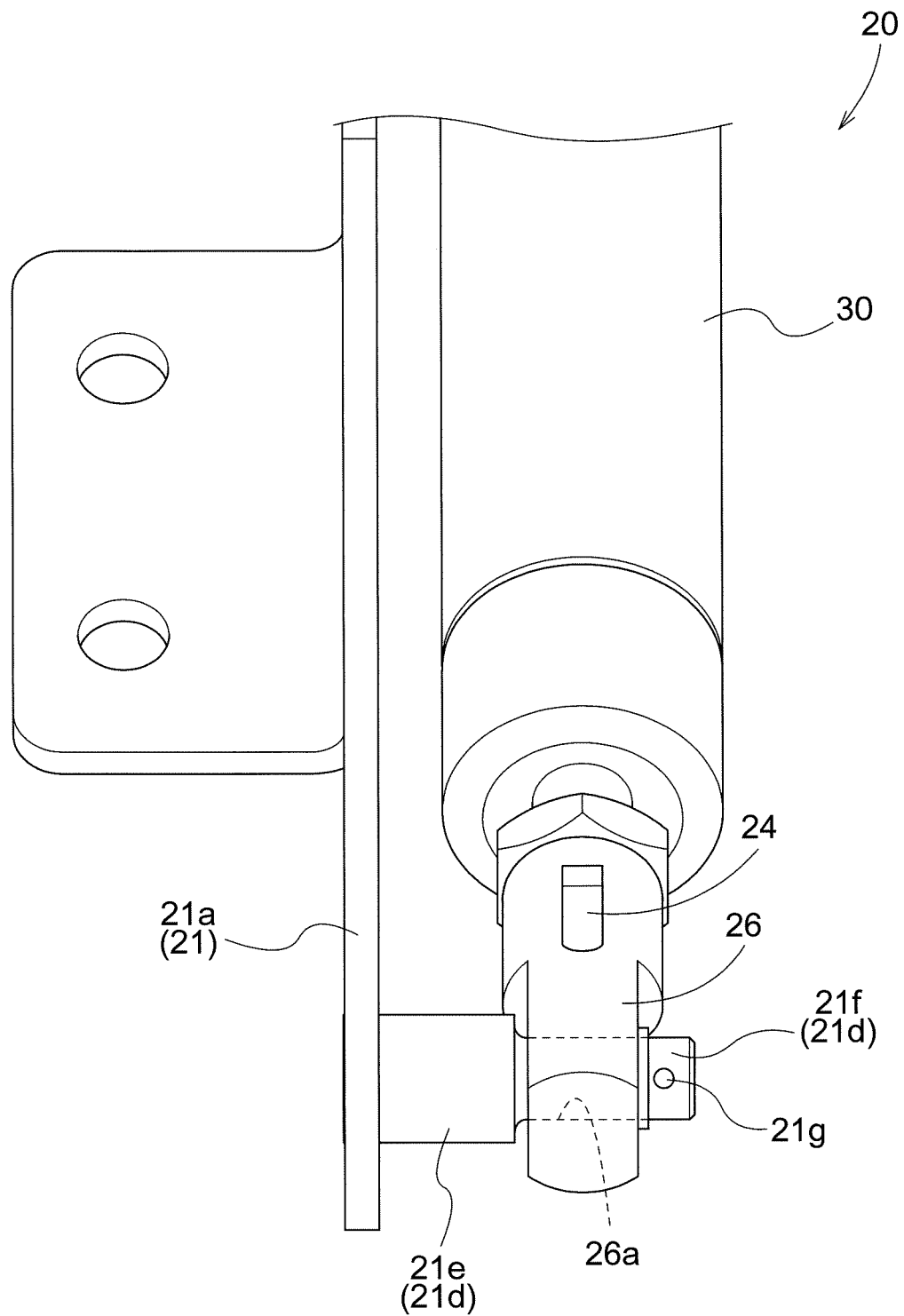
FIG. 9 is a view showing an arrangement in which a gap remains at a support portion of the damper.

As shown in FIG. 9, the left stay 21a includes a shaft 21d and this shaft 21d is inserted into the through hole 26a of the arm support portion 26. The shaft 21d consists of a base end portion 21e and an inserting portion 21f that have different outside diameters from each other. The outside diameter of the base end portion 21e is larger than the outside side diameter of the inserting portion 21f and larger than the inside diameter of the through hole 26a. Further, the outside diameter of the inserting portion 21f is smaller than the outside diameter of the base end portion 21e and smaller than the inside diameter of the through hole 26a. Therefore, the shaft 21d has its inserting portion 21f inserted into the through hole 26a. For preventing inadvertent withdrawal of the inserting portion 21f of the shaft 21d from the through hole 26a, a pin 21g is provided at the portion of the inserting portion 21f protruding from the through hole 26a.

When the base end portion 21e and the arm support portion 26 are placed in contact with each other, resistance will develop between the arm support portion 26 and the shaft 21d at the time of tiling the steering arrangement, which resistance acts as a resistance against sliding movement of the damper 30 relative to the shaft 21d, thus disabling smooth tilting movement. For this reason, the shaft 21d is inserted into the through hole 26a of the arm support portion 26, with a gap being formed between the base end portion 21e and the arm support portion 26.

However, if such gap is present between the base end portion 21e and the arm support portion 26, the damper 30 will shake or pitch along the shaft 21d, which may be a cause of looseness of the steering wheel 6.

In order to suppress occurrence of such shaking or pitching of the damper 30 along the shaft 21d, thus suppressing looseness of the steering wheel 6, in the case of the tiling mechanisms 20, 40 relating to this embodiment, a disc spring 70 is provided at the gap between the base end portion 21e and the arm support portion 26.

Figure 10:
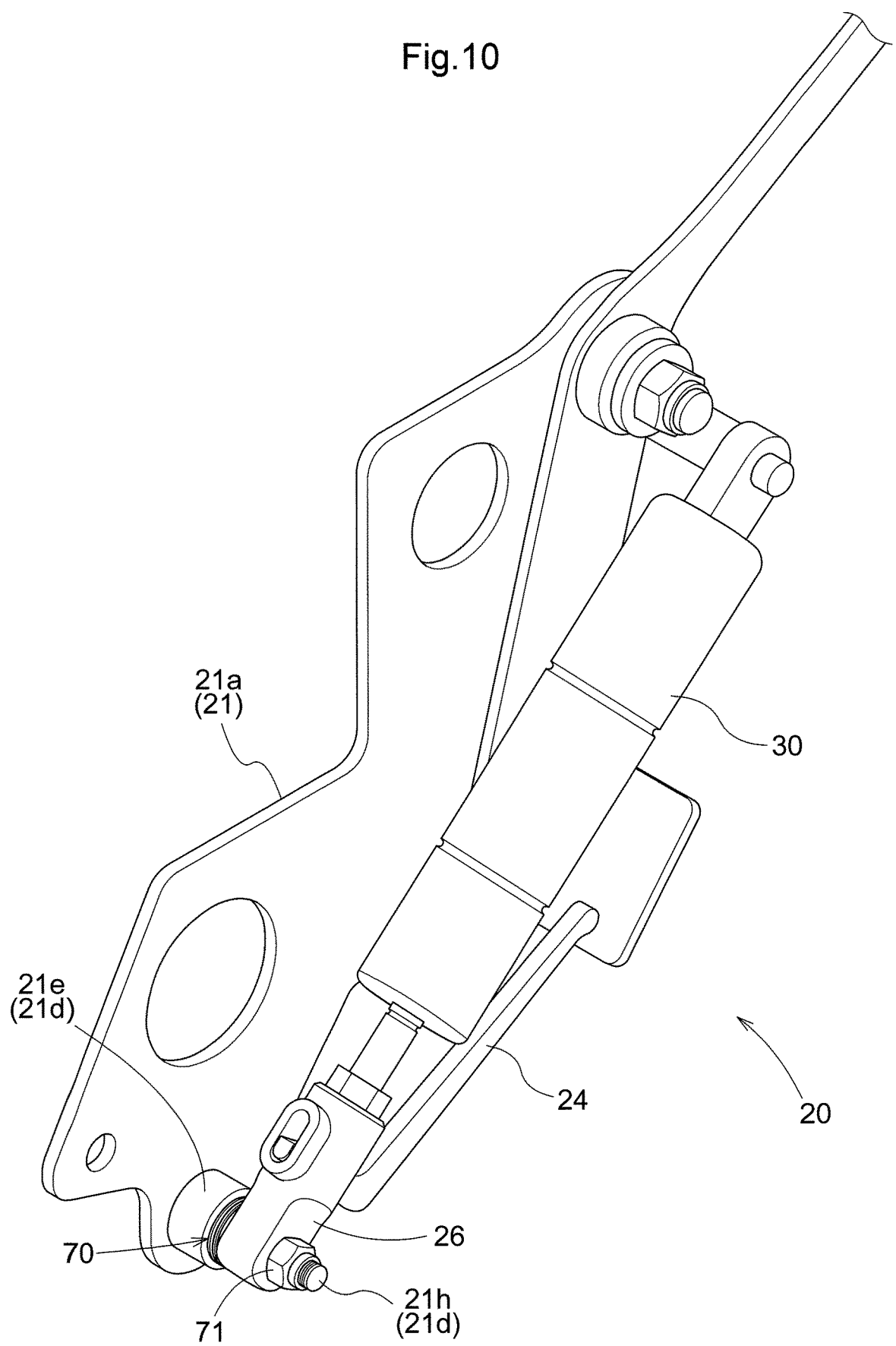
FIG. 10 is a principal portion perspective view illustrating an arrangement of a tilt mechanism having a disc spring at the support portion of the damper.
Figure 11:
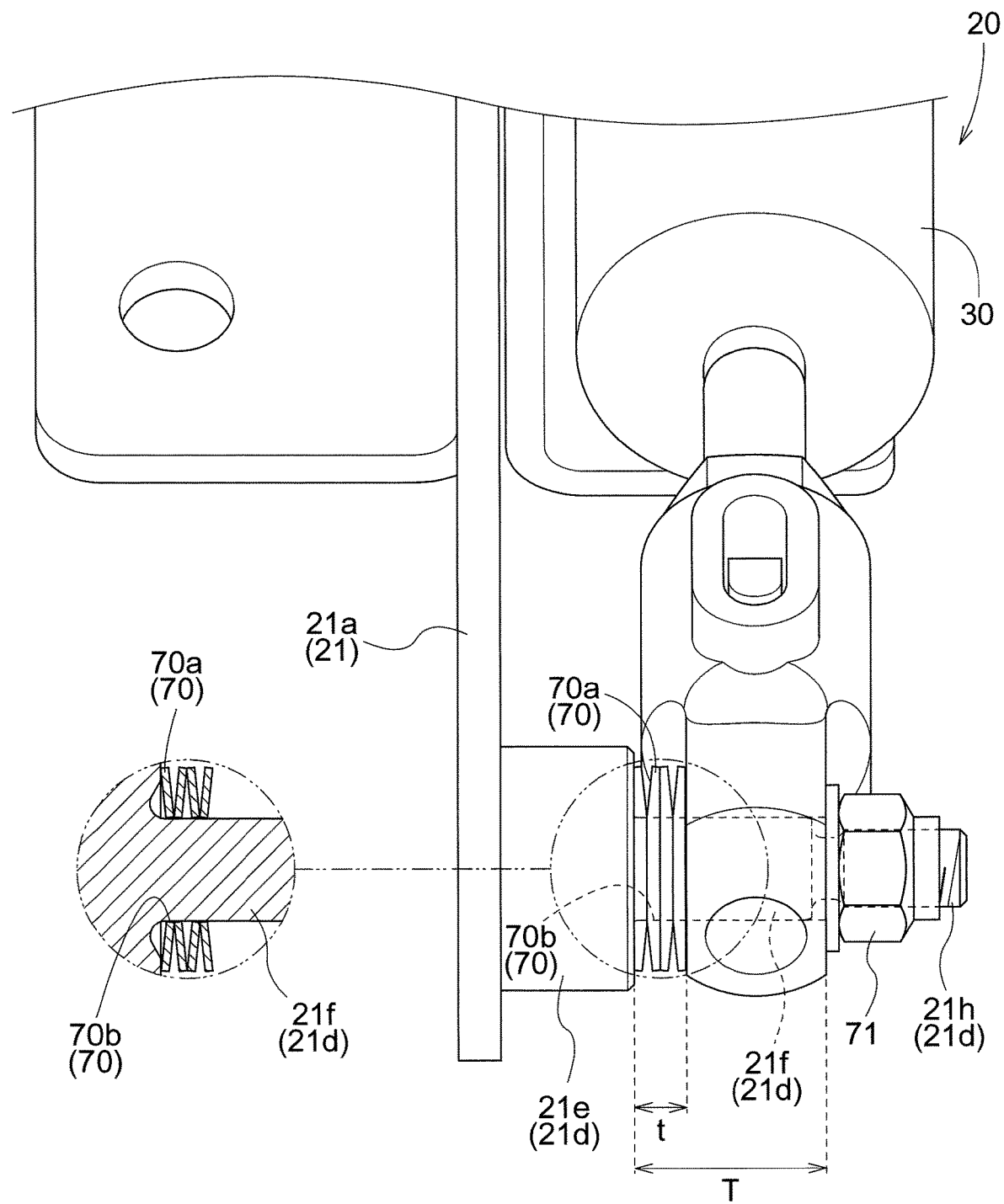
FIG. 11 is a view illustrating an arrangement providing a disc spring at the support portion of the damper.
Figure 12:
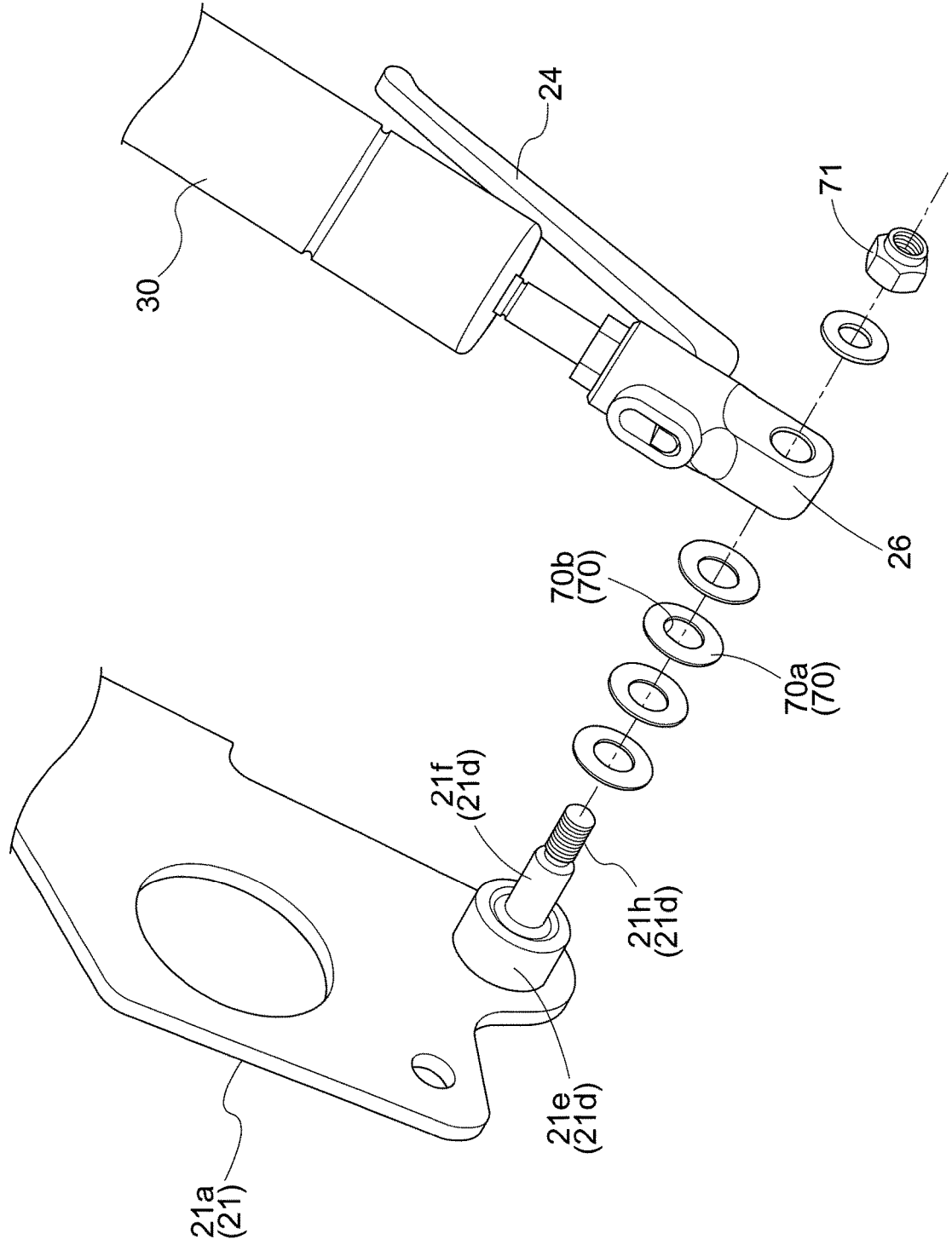
FIG. 12 is an exploded perspective view showing the arrangement providing the disc spring at the support portion of the damper.

Next, the supporting arrangement in this embodiment will be explained with reference to FIGS. 10-12, by way of an example of arrangement of supporting the arm support portion 26 of the damper 30 shown in FIGS. 3 and 4 to the left stay 21a. Incidentally, in FIG. 11, there is also shown an enlarged cross section of the disc spring 70.

As described above, the arm support portion 26 of the damper 30 is supported to the left stay 21a. In this, the shaft 21d included in the left stay 21a is inserted into the through hole 26a provided in the arm support portion 26 of the damper 30. The shaft 21d consists of the base end portion 21e and the inserting portion 21f and the outside diameter of the base end portion 21e is larger than the outside diameter of the inserting portion 21f. Further, the outside diameter of the base end portion 21e is larger than the inside diameter of the through hole 26a and the outside diameter of the inserting portion 21f is smaller than the inside diameter of the through hole 26a. Therefore, when the shaft 21d is inserted into the through hole 26a, the inserting portion 21f is inserted into the through hole 26a, but the base end portion 21e is not inserted into the through hole 26a.

As described above, in the supporting arrangements relating to the respective embodiments, in order to suppress development of resistance between the arm support portion 26 and the shaft 21d, gap was provided between the base end portion 21e and the arm support portion 26, to avoid contact between the base end portion 21e and the arm support portion 26. In contrast, in this embodiment, the disc spring 70 is provided to fill such gap between the base end portion 21e and the arm support portion 26.

By filling the gap between the base end portion 21e and the arm support portion 26 with the disc spring 70, an elastic or resilient force generated when the disc spring 70 is collapsed will serve to suppress the resistance between the arm support portion 26 and the shaft 21d, thus suppressing the resistance encountered by the damper 30 when its pivoting relative to the shaft 21d. Moreover, since no gap is present between the base end portion 21e and the arm support portion 26, shaking or pitching of the damper 30 along the shaft 21d is effectively suppressed, thus suppressing looseness of the steering wheel 6.

The disc spring 70 includes an outer edge portion 70a which can be warped and a hole 70b. The inside diameter of the hole 70b is larger than the outside diameter of the inserting portion 21f of the shaft 21d and smaller than the outside diameter of the base end portion 21e. The disc spring 70 is disposed between the base end portion 21e and the arm support portion 26, with the inserting portion 21f being inserted into the hole 70b.

On the shaft 21d, in the order from the base end portion 21e side, the disc spring 70 and the arm support portion 26 of the damper 30 are disposed. The disc spring 70 and the arm support portion 26 thus disposed on the shaft 21d are fixed in position by a nut 71. At the leading end region of the inserting portion 21f of the shaft 21d, there is provided a threading portion 21h on which the nut 71 is to be threaded. The nut 71 threaded to the threading portion 21h and the base end portion 21e together sandwich the disc spring 70 and the arm support portion 26 thus fixing these in position.

When the arm support portion 26 is to be supported to the left stay 21a, firstly, the inserting portion 21f of the shaft 21d is inserted into a hole 70b of the disc spring 70. Next, the inserting portion 21f of the shaft 21 is inserted into the through hole 26a of the arm support portion 26. Lastly, the nut 71 is threaded to the threading portion 21h of the shaft 21d.

In the course of the above, in order not to form any gap between the nut 71 and the base end portion 21e, the nut 71 will be threaded such that the disc spring 70 and the arm support portion 26 may be sandwiched and clamped between the nut 71 and the base end portion 21e. With this, shaking or pitching movement of the damper 30 along the shaft 21d is suppressed and looseness of the steering wheel 6 is suppressed consequently.

Further, as the nut 71 and the base end portion 21e together clamp/sandwich the disc spring 70 and the arm support portion 26 therebetween, there occurs a deformation (collapse) at the outer edge portion 70a of the disc spring 70 in a direction to reduce the amount of warping of the disc spring 70. With this, an elastic force is generated in the disc spring 70, which acts to suppress the resistance between the arm support portion 26 and the shaft 21d, thus suppressing the resistance encountered by the damper 30 when pivoting relative to the shaft 21d. Incidentally, this elastic force of the disc spring 70 acting as a resistance against the pivoting of the damper 30 relative to the shaft 21d is determined by the amount of collapsing of the outer edge portion 70a of the disc spring 70. And, this amount of collapsing of the outer edge portion 70a of the disc spring 70 is determined in turn by a fastening amount of the nut 71, which in turn is determined by a distance (t) between the base end portion 21e at which the disc spring 70 is disposed and the arm support portion 26, in other words, a distance (T) between the base end portion 21e and the nut 71. As described above, the nut 71 will be threaded such that shaking of the damper 30 along the shaft 21d is suppressed and the resistance between the arm support portion 26 and the shaft 21d *may be suppressed appropriately.*

Meanwhile, the disc spring 70 provided between the base end portion 21e and the arm support portion 26 may be a single disc spring or may be a plurality of such disc springs. In case a plurality of disc springs 70 are provided, it is preferred that in adjacent disc springs 70, respective outer edge portions 70a thereof may be warped in opposite directions to each other. For instance, four disc springs 70 may be arranged such that from the base end portion 21e side, the respective warping directions thereof are on the base end portion 21e side, the arm support portion 26 side, the base end portion 21e side and the arm support portion 26 side, in this order respectively. With such arrangement, the elastic force can be generated in an efficient manner.

Moreover, between the base end portion 21e and the arm support portion 26, an elastic body having a predetermined elasticity may be provided, rather than the disc spring(s) 70. The elastic body in this case too will be configured such that the resistance encountered by the damper 30 during its pivoting along the shaft 21d may be suppressed appropriately and the shaking of the damper 30 along the shaft 21d may be effectively suppressed.

Further, the shaft 21d may not be necessarily provided with the base end portion 21e. In this case, the disc spring 70 will be provided between the left stay 21a and the arm support portion 26. Further, the position-fixing of the disc spring 70 and the arm support portion 26 is not limited to the arrangement by the nut 71. Instead, the disc spring 70 and the arm support portion 26 may be fixed in position by any appropriate fixing tool.

Moreover, in case the damper 30 is not supported to the stay 21, the disc spring 70 may be provided between a portion of the vehicle body frame 3 or the like supporting the damper 30 and the arm support portion 26. Further alternatively, the arrangement of the disc spring 70 is not limited to the arrangement of this being provided between the left stay 21a (base end portion 21e) and the arm support portion 26. Instead, as shown in FIG. 7 and FIG. 8, it may be provided between the steering support mount 22 and the arm support portion 42 or between the left stay 21a and the pillow ball joint 27. Namely, the sole requirement of the arrangement of disposing the disc spring 70 is it being provided anywhere between the vehicle body frame 3 supporting the damper 30, 41 and the portion acting as the pivot axis for the damper 30, 41, so that development of resistance encountered by the damper 30,41 when its pivoting along the pivot axis may be suppressed appropriately and shaking of the damper 30, 41 along the pivot axis may be effectively suppressed.

(3) In the foregoing respective embodiments, the damper 30 or the damper 41 was disclosed as an example of the lock mechanism. However, the lock mechanism may be any mechanism that allows change of the state of the tilt mechanism 20 or the tilt mechanism 40 between the releasing state and the locking state.

INDUSTRIAL APPLICABILITY

The present invention is applicable not only to a multiple-purpose work vehicle, but also to various work vehicles that allow steering operation thereby by a steering wheel.

DESCRIPTION OF REFERENCES SIGNS

3: vehicle body frame
6: steering wheel
14: steering shaft
21c: shaft
22: steering support mount
25: tilt lever
27: pillow ball joint (annular member)
27a: through hole (first through hole)
27b: spherical inner ring
27c: through hole (second through hole)
28: support portion
29: bolt
30: damper (lock mechanism)
70: disc spring (elastic body)

The invention claimed is:

1. A work vehicle comprising:
a vehicle body frame;
a shaft supported to the vehicle body frame;
a steering support mount supported to the vehicle body frame to be pivotable along the shaft;
a steering shaft pivotally supported to the steering support mount;
a steering wheel fixed to the steering shaft;
a lock mechanism configured to be changeable in its state between a releasing state for allowing a pivotal movement of the steering support mount and a locking state for inhibiting the pivotal movement, the lock mechanism being supported to the vehicle body frame to be pivotable along a pivot axis by providing a gap between the lock mechanism and the vehicle body frame;
an elastic body provided on the pivot axis in the gap between the vehicle body frame and the lock mechanism; and
a tilt lever for causing a state change of the lock mechanism to either the releasing state or the locking state.

2. The work vehicle of claim 1, wherein the lock mechanism has its one end supported to the vehicle body frame and its other end supported to the steering support mount.

3. The work vehicle of claim 1, wherein the elastic body comprises one or more disc springs.

4. The work vehicle of claim 3, wherein the lock mechanism comprises a damper.

* * * * *